Dec. 12, 1950   E. B. WHIGAM   2,533,254
LATHE TOOL
Filed Sept. 10, 1945   2 Sheets-Sheet 1
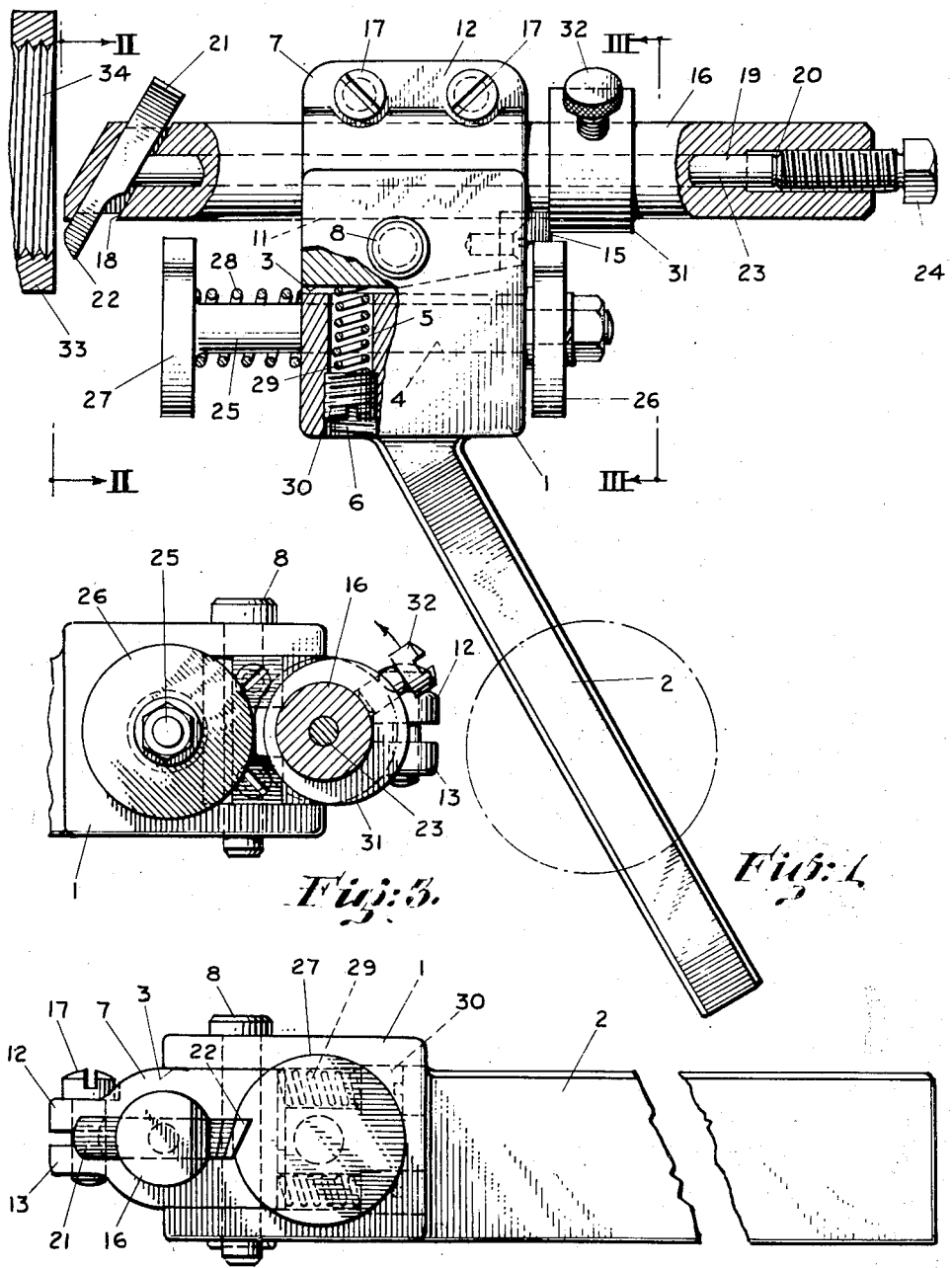
Elgin B. Whigam
INVENTOR
By D. C. Snyder
Attorney.

Dec. 12, 1950  E. B. WHIGAM  2,533,254
LATHE TOOL

Filed Sept. 10, 1945  2 Sheets-Sheet 2

Elgin B. Whigam
INVENTOR

By  O. E. Snyder
Attorney.

Patented Dec. 12, 1950

2,533,254

UNITED STATES PATENT OFFICE 2,533,254

LATHE TOOL

Elgin B. Whigam, United States Navy, San Francisco, Calif.

Application September 10, 1945, Serial No. 615,487

5 Claims. (Cl. 82—5)

(Granted under the act of March 3, 1883, as amended April 30, 1928; 370 O. G. 757)

This invention relates to lathe tools and more particularly to lathe tools of the type used in cutting interior threads or for performing other interior cutting operations in bores.

Lathe tools of the type referred to commonly are supported in the tool post of an engine or turret lathe and carry a tool bit that may have one or more cutting edges adapted to bear against the interior surface of a bore in material secured to the chuck of the lathe so as to cut a thread therein upon rotation of the material thereagainst. Similar tools may also be used to carry other shaped bits for performing other cutting operations on the inside of a bore. In using such tools for cutting threads it is usually necessary to make a plurality of cuts, often as many as eight or ten, in order to cut a thread of the desired depth without damaging the material. With tools heretofore used, it has been necessary to adjust the lathe so that the tool bit is out of engagement with the thread after the completion of each cut before the tool can be removed from the bore and the next cut started. In addition there has been no facile means provided for stopping threads at a predetermined longitudinal position in the bore.

Objects of the present invention are to provide an improved lathe tool in which a tool bit carried thereby is automatically disengaged from threads being cut in a bore after such threads have been cut through a predetermined length or distance within the bore; to provide a lathe tool which eliminates the necessity for adjusting the lathe in order to remove the tool from the operation between successive cuts; and to provide a lathe tool of the type referred to that is adaptable for use on standard engine or turret lathes of types commonly available.

It is a further object of the invention to provide for carrying out the foregoing objects in a facile, economical and efficient manner.

In accomplishing these and other objects of the present invention, I have provided improved details of structure, the preferred form of which is illustrated in the accompanying drawings, wherein:

Fig. 1 is a side elevational view, partly in section, of a lathe tool embodying the features of my invention and showing the relation of the parts as the tool is about to start a threading operation.

Fig. 2 is an end elevational view of the tool shown in Fig. 1, taken substantially on the line II—II of Fig. 1.

Fig. 3 is a sectional view of the tool shown in Fig. 1, taken substantially on the line III—III of Fig. 1.

Figure 5:
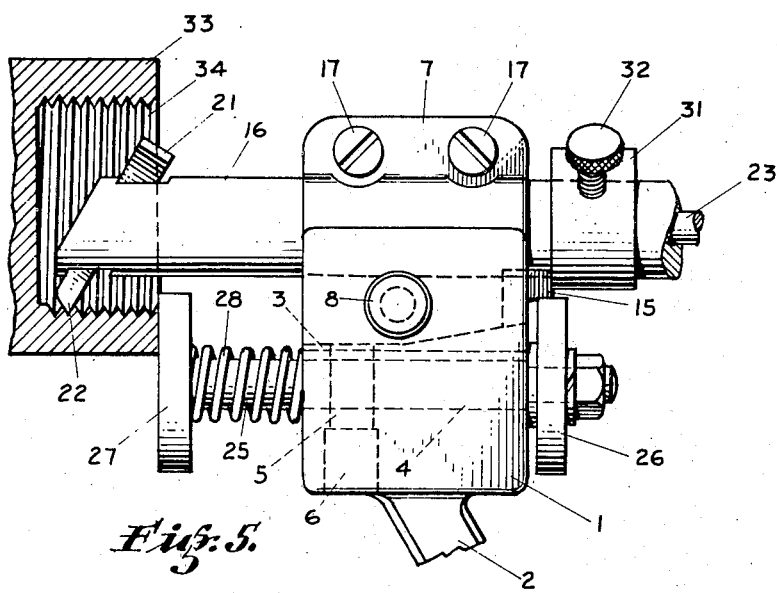
Fig. 5 is a side elevational view of the tool shown in Fig. 1, but showing the relation of the parts as the tool is cutting a thread and is approaching the point at which the tool bit is disengaged from the thread.

Referring more in detail to the drawings:

The lathe tool of my invention comprises a body 1. Preferably formed integrally with the body 1 is a shank 2 adapted to be secured in the tool post of a standard engine or turret lathe, not shown, to support the tool during a cutting operation. A longitudinal channel shaped recess 3 is preferably formed in the body 1 in the face opposite the face on which the shank 2 is connected to the body, Fig. 2. A longitudinal bore 4 is provided in the body 1, preferably having its longitudinal axis substantially parallel to the recess 3. One or more transverse bores 5 are also provided in the body 1 and extend from the face on which the shank 2 is connected into the bottom of the recess 3, there preferably being two such bores, one of which is located on either side of the longitudinal bore 4. The transverse bores 5 have outer counterbored threaded portions 6.

Figure 4:
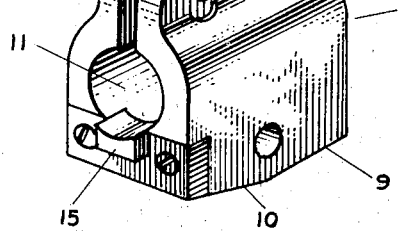
Fig. 4 is a perspective view of the supporting block for the boring bar used in the tool shown in Fig. 1.

A block 7 is pivotally connected to the body 1 within the channel shaped recess 3 on a pivot stud 8. Referring particularly to Fig. 4, the block 7 has a forward lower bearing surface 9 that is substantially square with respect to the ends of the block and a rear lower bearing surface 10 that is beveled with respect to the forward bearing surface 9. A longitudinal recess 11 is provided in the face of the block 7 opposite the bearing faces 9 and 10. The recess 11 is surmounted by clamp portions 12 and 13, which have bores 14 therethrough that are threaded through one of the portions 12 or 13 and are smooth through the other. A latch or stop member 15 is rigidly connected to the rear face of the block 7. The latch or stop member 15 may be formed integrally with the block 7, but preferably is in the form of an attached insert, as shown, since it is subject to wear and is desirably made to be replaceable. This latch member 15 constitutes part of a mechanism, hereinafter described, for retaining in cutting position and releasing for movement into non-cutting position the boring bar assembly of this invention.

Secured within the recess 11 of the block 7 for longitudinal sliding adjustment is a boring bar 16. A pair of screws 17 are threadedly engaged through the bores 14 in the clamp portions 12 and 13 of the block 7 and are adapted, when tightened, to clamp the boring bar 16 in adjusted position in the recess 11. The boring bar 16 has an oblique transverse aperture 18 passing therethrough adjacent the forward end thereof and a longitudinal bore 19 extending from the rearward end of the bar into the transverse aperture 18. The rearward end of the bore 19 is counterbored and tapped, as indicated at 20, Fig. 1.

The transverse aperture 18 in the boring bar 16 is adapted to receive a tool bit 21. For purposes of illustration, the tool bit 21 is shown as a threading bit of the type having a single cutting edge 22 adapted to cut an interior thread. It is to be understood, however, that such type of bit is merely exemplary of the tyes of bit that may be employed with the lathe tool. As is well known in the art, an assembly of the type hereinbefore described is generally designated as a boring tool holder of which the actual cutting portion is designated as a cutting bit or tool bit and the extended portion carrying the bit is designated as a boring bar. The bit may be of any desired shape: e. g. similar to a turning tool, in which case the boring operation results in a smooth-walled cut or e. g. a form cutter, as, for example, a thread cutting tool, in which case the operation performed by the assembly is entitled boring a thread and the result is a workpiece with a thread cut thereon. In either case, the operation is designated as a boring operation. As is also well known in the art, the boring bar may be formed integral with the cutting bit or may be adapted to receive various separable cutting bits. See "Machine Tool Operation" (Part I), Second edition, by Henry D. Burghardt, published by McGraw-Hill, pages 262 et seq. See also "Tool Making" by Charles B. Cole, published by American Technical Society, 1943, page 104. Because the function performed by my invention is particularly valuable in thread boring operations, the illustrated embodiment shows a boring bar having a threaded bit. Slidably fitted within the bore 19 in the boring bar 16 is a rod 23 that extends from the counterbored portion 20 thereof into the transverse aperture 18 and is adapted to bear against the tool bit 21 to secure it in adjusted position. A bearing screw 24 is threadedly engaged in the tapped counterbored portion 20 of the bore 19 and at its inner end bears against the rearward end of the rod 23 to force the rod into tight engagement against the tool bit 21.

Slidably fitted within the longitudinal bore 4 in the body 1 is a plunger 25 that has a latch head 26 adjacent its rearward end and a contact head 27 adjacent its forward end. The latch head and the contact head may be in the form of discs, one of which is formed integrally with the plunger 25 and the other of which is secured thereto, as shown in the drawings, but it is to be understood that such construction is merely exemplary and that the heads may assume other designs.

A helical compression spring 28 surrounds the plunger 25 between the body 1 and the contact head 27. The spring 28 urges the plunger 25 forwardly to the extent permitted by engagement between the latch head 26 and the body 1. When the forward face of the latch head 26 is in contact with the body 1, the peripheral face thereof contacts the latch member 15 to retain the elements of the tool in the relation shown in Fig. 1.

A pair of helical compression throw out springs 29 are fitted into the transverse bores 5 in the body 1 and are secured therein by screws 30 that are threadedly engaged in the counterbored tapped portions 6 of the bores 5. The springs 29 extend from the inner ends of the screws 30 into the channel shaped recess 3 where they bear against the forward lower bearing surface 9 of the block 7 and thereby tend to rotate the block 7 about the pivot stud 8 in a clockwise direction as viewed in Fig. 1.

Figure 6:
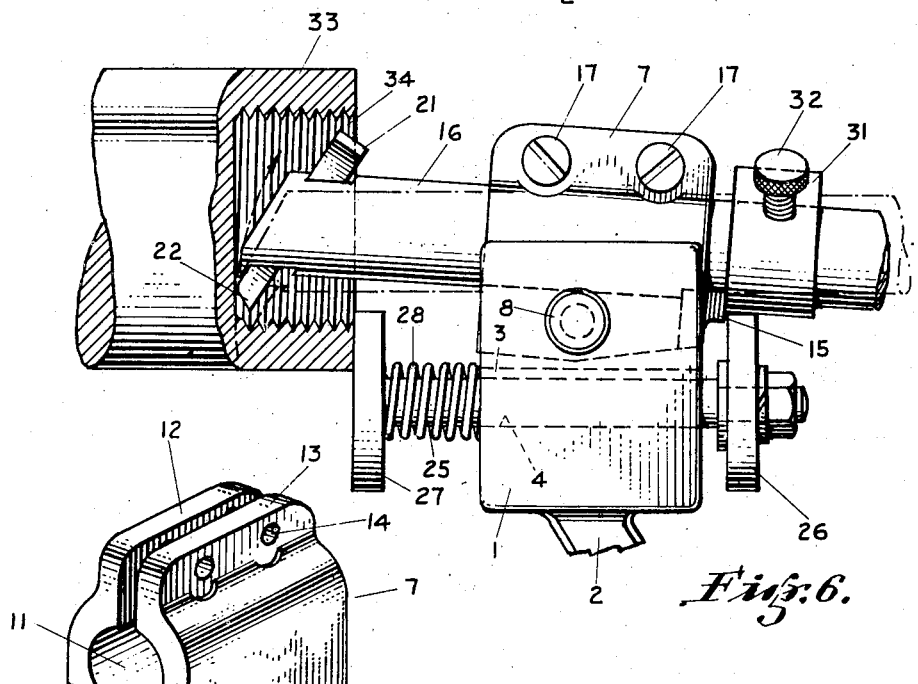
Fig. 6 is a side elevational view of the tool shown in Fig. 1, but showing the relation of the parts after the tool has completed a cut and the tool bit has been disengaged from the thread.

An eccentric ring 31 is slidably and rotatably fitted around the boring bar 16 rearwardly of the block 7. A set screw 32 is threadedly engaged in the ring 31 and the inner end thereof bears against the outer surface of the boring bar 16 to secure the ring in adjusted position with respect to the boring bar. The outer periphery of the ring 31 constitutes a stop surface which the latch head 26 engages in abutting relation to limit the movement of the boring bar assembly into the non-cutting position shown in solid lines in Fig. 6.

From the foregoing description it is apparent that I have provided mechanism to maintain my boring bar assembly in cutting position and to release the assembly for spring-pressed movement into non-cutting position. This mechanism comprises the latch member 15 and the adjustable stop surface of the eccentric ring 31, both located on the assembly, and the plunger 25 having the contact head 27 and the latch head 26 which latter serves as abutment means coacting with the latch member 15 and the stop surface of ring 31 by direct contact therewith.

*Operation*

The shank 2 is secured in the tool post of a suitable engine or turret lathe. An appropriate tool bit 21 is inserted in the aperture 18 in the boring bar 16 and secured in adjusted position by tightening the screw 24 against the rod 23.

The block 7 is set so that the forward lower bearing surface 9 bears against the bottom of the channel shaped recess 3 in the body 1. The latch head 26 engages the latch member 15 on the block 7 to retain the block and associated elements in this position against the action of the throw out springs 29, and the tool may be regarded as "cocked," Fig. 1.

The screws 17 are loosened and the boring bar 16 is adjusted longitudinally in the recess 11 until the distance between the cutting edge 22 of the tool bit 21 and the forward face of the contact head 27 plus the distance by which the latch head 26 overlaps on the latch member 15 is equal to the longitudinal distance within the bore that it is desired to have the cutting operation extend. The distance by which the latch head 26 overlaps against the latch member 15 is constant and of a known magnitude for any one tool. The screws 17 are retightened to secure the boring bar in longitudinal adjusted position.

Fig. 1 shows the tool set in the manner just described and about to start cutting a thread. The numeral 33 therein designates a piece of material secured in the chuck of a lathe. The material has a bore interiorly of which is a partially cut thread 34.

As the feeding of the tool continues, the forward face of the contact head 27 moves longitudinally with the tool and reaches the point where it contacts the rearward face of the material 33, this being the condition shown in Fig. 5. As feeding continues from this condition, the plunger 25 is forced rearwardly through the longitudinal bore 4 against the action of the spring 28. The latch head is thus pushed out of contact with the latch member 15 and the tool is "tripped."

When the tripping occurs, the throw out springs 29 rotate the block 7 in a clockwise direction as viewed in Figs. 1 and 5 until the rear bearing face 10 thereof contacts the bottom of the recess 3 or until such movement is limited by other stop means hereinafter explained. Such movement of the block 7 is transmitted to the tool bit 21 through the boring bar 16 and lifts the cutting edge 22 thereof out of the threads 34, this being the condition shown in Fig. 6. The tool is free to be removed from the bore in the material 33 without the necessity of adjusting the lathe.

After the tool has been removed, it may again be cocked to the condition shown in Fig. 1 and the lathe reset to make another cut in the material.

The eccentric ring 31 is provided in order to make it possible to vary the arc through which the block 7 rotates when the tool is tripped. The ring 31 may be slidably adjusted toward the right as viewed in Fig. 1 to an inoperative position, in which case the block 7 rotates until the rear bearing face 10 thereof contacts the bottom of the recess 3 when the tool is tripped. This is the adjustment normally employed when making a deep cut in a bore of relatively large diameter, but becomes unsuitable as the depth of cut or the diameter of the bore decreases. The ring 31 may then be moved longitudinally to the position shown in Fig. 1. With the ring so positioned, when the tool is tripped, the peripheral face of the latch head 26 contacts the peripheral face of the ring 31 to limit the arc of rotation of the block 7 and associated mechanism. The ring 31 is preferably made eccentric and rotatable in order to increase the range of adjustment, the minimum arc of rotation being obtained when the portion of the ring of greatest eccentricity is adjacent the latch head 26.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A lathe tool comprising a body having a longitudinal bore therethrough, means adapted to support the body in the tool post of a lathe, a block pivoted to said body for movement between a first position and a second position and having a latch member fixed thereto, a boring bar secured to said block for longitudinal adjustment thereon, a tool bit carried by said boring bar and being adapted to perform an interior cutting operation in material secured in the chuck of a lathe in the first position of said block and being free of a cutting so made in the second position of said block, spring means in said body urging said block to said second position, a plunger slidably supported in said longitudinal bore, means on said plunger adapted to contact said body to limit displacement of said plunger in said bore and adapted to contact said latch member to maintain said block in said first position against the action of said spring means, and means on said plunger engageable with material secured in the chuck of a lathe to free said latch member to move said block to said second position.

2. A lathe tool comprising a body having a longitudinal bore therethrough, means adapted to support the body in the tool post of a lathe; a block pivoted to said body for movement between a first position and a second position and having a latch member fixed thereto; a boring bar secured to said block for longitudinal adjustment thereon; a tool bit carried by said boring bar and being adapted to perform a cutting operation on material secured in the chuck of a lathe in the first position of said block and being free of a cutting so made in the second position of said block; spring means in said body urging said block to said second position; a plunger slidably supported in said longitudinal bore; a contact head on said plunger, a spring carried on said plunger between said contact head and said body for urging said plunger through said bore, means on said plunger adapted to abut said latch member to maintain said block in said first position against the action of said spring means and to limit displacement of said plunger within said bore under the urging of said spring; means on said plunger engageable with said material secured in said chuck to move said plunger to free said latch member whereby said spring may move said block to said second position; and an eccentric ring mounted on said boring bar and adapted, upon movement of said abutting means out of engagement with said latch member, to engage said abutting means on said plunger to limit movement of said block, said eccentric ring being mounted for adjustment about the longitudinal axis of said boring bar and being provided with means to hold it in adjusted position, whereby the motion of said block from said first position to said second position can be limited to adjustable distances.

3. A lathe tool comprising a body; means adapted to support the body in the tool post of a lathe; a boring bar assembly comprising a block, a boring bar secured for longitudinal adjustment in said block, and a tool bit carried by said boring bar and adapted to perform a cutting operation on material held in the chuck of a lathe; means pivotally connecting said assembly to said body for movement between a first position in which said bit cuts said material and a second position in which said bit is free of the cut in said material made in said first position; spring means urging said assembly to said second position; and mechanism to maintain said assembly in said first position and to release said assembly for movement into said second position comprising a plunger supported by said body for sliding movement relative thereto, a latch member and a stop surface on said assembly, abutment means on said plunger adapted to engage said body to limit displacement of said plunger therewithin and to engage said latch member to maintain said assembly in said first position against the action of said spring means and to engage said stop surface to limit the movement of said assembly into said second position, and means on said plunger engageable with said material in said chuck upon relative movement of said tool and said chuck to displace said plunger from engagement with said latch member; said mechanism being so constructed as to be adjustable to vary the displacement of said assembly between said two positions and being provided with means to fix said mechanism in adjusted arrangement.

4. For use with a lathe having a tool post and a rotatable chuck adapted to support material on which machine work is to be performed, a tool comprising a body; a shank for securing said body to said tool post; a boring bar; means pivotally connecting the boring bar to the body for movement between a first position and a second position; a tool bit carried by said boring bar engageable with said material supported in said chuck to perform a cutting operation thereon in the first position of said boring bar and being free of a cutting so made in the second position of said boring bar; spring means in said body urging said boring bar to said second position; a latch member arranged to pivot as a unit with said boring bar; an eccentric ring mounted on said boring bar having a stop surface thereon; and a plunger slidably supported by said body having a latch head engageable with said latch member to maintain said boring bar in said first position against the action of said spring means and engageable with said stop surface to limit the movement of said boring bar into said second position and engageable with said body to limit displacement of said plunger therewithin and having means engageable with the material supported in said chuck whereby said plunger is moved to disengage said latch member; said eccentric ring being mounted for adjustment on said boring bar whereby the location on said stop surface engaged by said latch head can be varied to vary the movement of said boring bar from said first position to said second position.

5. A lathe tool comprising a body, means adapted to support the body in the tool post of a lathe, a boring bar, means pivotally connecting the boring bar to the body for movement between a first position and a second position, said boring bar being adapted to carry a tool bit engageable with material secured in the chuck of a lathe to perform an interior cutting operation therein in the first position of said boring bar and being free of a cutting so made in the second position of said boring bar, spring means in said body urging said boring bar to said second position, a plunger slidably supported by said body, latch means arranged to pivot as a unit with said boring bar and engageable with a latch head carried by said plunger to maintain said boring bar in said first position against the action of said spring means, said latch head serving as a stop to limit displacement of said plunger within said body and means on said plunger engageable with material secured in the chuck of a lathe to disengage said latch means to move said boring bar to said second position.

ELGIN B. WHIGAM.

REFERENCES CITED

The following references are of record in the file of this patent:

UNITED STATES PATENTS

| Number | Name | Date |
|---|---|---|
| 861,381 | Merrell | July 30, 1907 |
| 2,364,241 | Pederson | Dec. 5, 1944 |

FOREIGN PATENTS

| Number | Country | Date |
|---|---|---|
| 363,274 | France | July 25, 1906 |
| 80,426 | Switzerland | Mar. 1, 1919 |
| 542,111 | Great Britain | Dec. 24, 1941 |